United States Patent [19]

Reese et al.

[11] 4,375,978
[45] Mar. 8, 1983

[54] LIGHTWEIGHT OUTLINE MOLD WITH LOW THERMAL INERTIA FOR SHAPING GLASS SHEETS

[75] Inventors: Thomas J. Reese, Sarver; Stephen J. D. Jursa, Saxonburg; Dean L. Thomas, Glenshaw, all of Pa.

[73] Assignee: PPG Industries, Inc., Pittsburgh, Pa.

[21] Appl. No.: 279,411

[22] Filed: Jul. 1, 1981

[51] Int. Cl.³ ............................................. C03B 23/025
[52] U.S. Cl. ............................................. 65/287; 65/291
[58] Field of Search ............................ 65/287, 290, 291

[56] References Cited

U.S. PATENT DOCUMENTS

| | | | |
|---|---|---|---|
| 3,211,542 | 10/1965 | McRoberts | 65/290 |
| 3,278,289 | 10/1966 | Humes | 65/290 |
| 3,372,015 | 3/1968 | Richardson | 16/103 |
| 3,484,226 | 12/1969 | Golightly | 65/291 |
| 3,511,628 | 5/1970 | Adamson | 65/107 |
| 3,586,492 | 6/1971 | McMaster | 65/287 |
| 3,976,462 | 8/1976 | Sutara | 65/107 |
| 4,043,785 | 8/1977 | Reese | 65/107 |
| 4,047,916 | 9/1977 | Reese et al. | 65/106 |
| 4,119,428 | 10/1978 | DeAngelis et al. | 65/287 |
| 4,157,254 | 6/1979 | Thomas et al. | 65/273 |

FOREIGN PATENT DOCUMENTS 736880 6/1966 Canada.

*Primary Examiner*—Arthur D. Kellogg
*Attorney, Agent, or Firm*—Donald C. Lepiane; Edward I. Mates

[57] ABSTRACT

A lightweight outline mold for shaping glass sheets comprising a shaping rail having low thermal inertia, tabs attaching said rail to a reinforcing frame through rods by welding said rods at points spaced from said shaping rail and using fastening means that do not require localized heat, such as rivets, to attach the shaping rail to the tabs in a manner that avoids localized heating of the shaping rail during mold fabrication that would distort the shaping rail if the latter were welded directly to the reinforcing frame.

7 Claims, 2 Drawing Figures

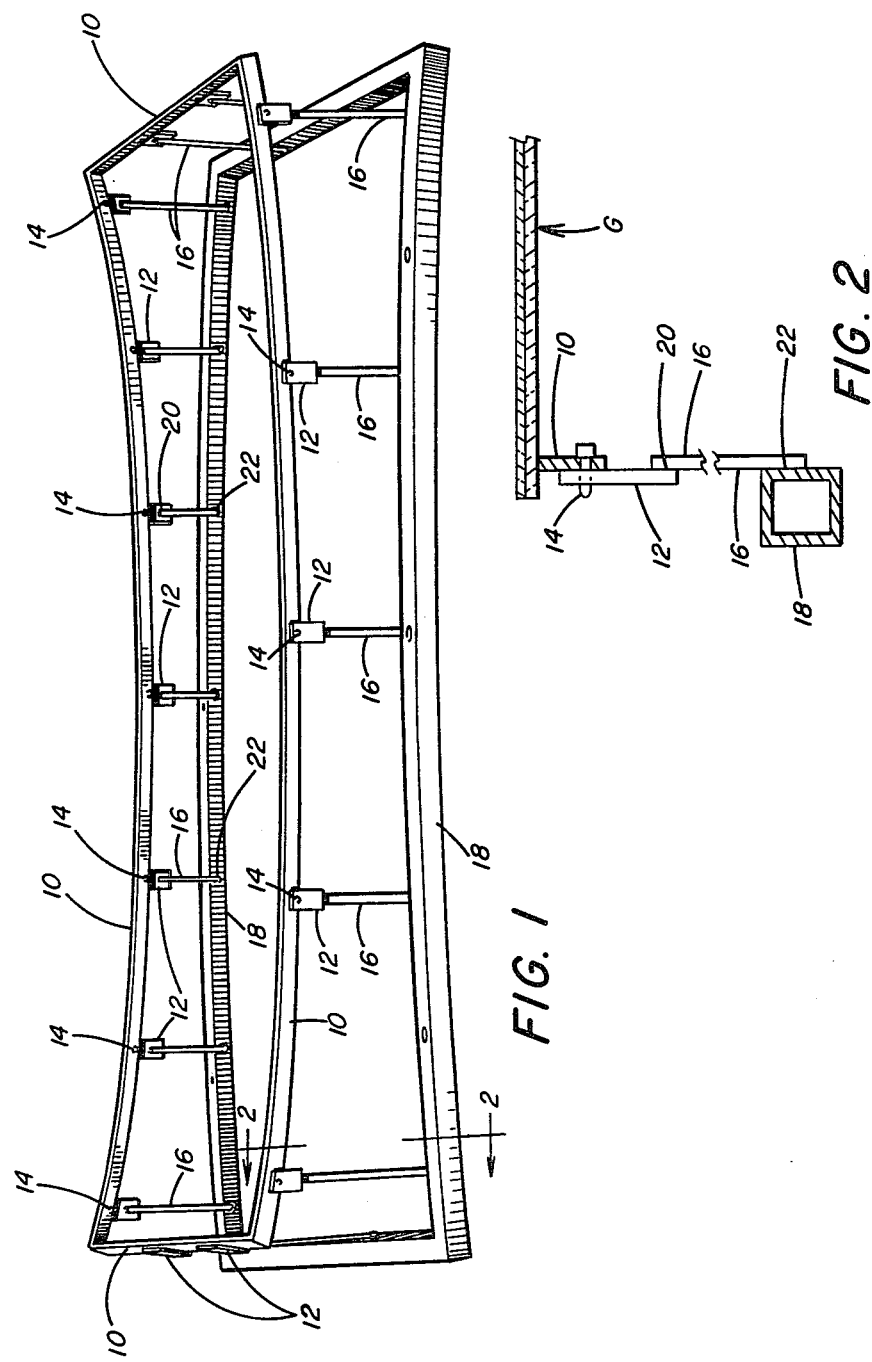

LIGHTWEIGHT OUTLINE MOLD WITH LOW THERMAL INERTIA FOR SHAPING GLASS SHEETS

BACKGROUND OF THE INVENTION

Field of the Invention

This invention relates to lightweight molds having low thermal inertia for bending glass sheets in pairs. The pairs are used to make bent laminated windshields. The present invention is especially suitable for mass production of automobile windshields of safety glass conforming to the American Standard Safety Code for Safety Glazing Materials for Glazing Motor Vehicles Operating on Land Highways Z 26.1 (1950), approved May 16, 1950 by the American Standards Association.

Automobile windshields of safety glass consist essentially of two matched sheets of curved glass such as commercial float glass of a soda-lime-silica composition, and an interlayer of a sheet of thermoplastic resin such as plasticized polyvinyl butyral sandwiched between the two glass sheets. The plastic interlayer is resilient and also adheres to the glass, especially when the glass sheets have matching shapes. Therefore, when a laminated safety glass windshield is broken on impact, the glass sheet fragments that form with jagged edges do not fly about. Instead, they remain attached to the plastic interlayer while the latter yields in response to impact against the windshield.

In present commercial practice, pairs of bent glass sheets used as components in laminated safety glass windshields are mass produced by the following series of steps:

(1) Cutting the pair of glass sheets while flat to their ultimate outlines differing slightly in size from one another;

(2) Arranging the sheets in pairs;

(3) Applying a parting material to the upper surface of the slightly larger sheet of each pair;

(4) Aligning each pair of sheets in face to face relation so that the slightly smaller sheet is above the other sheet of the pair and the parting material is between the sheets of the pair;

(5) Loading a pair of aligned sheets at a mold loading station on an outline bending mold having a shaping rail provided with an upwardly facing edge surface of concave elevation that conforms in elevation and plan outline to a shape slightly inward of the aligned margins of the pair of sheets after bending, said rail being connected to a relatively rigid reinforcing frame;

(6) Passing a succession of glass laden molds through a bending and annealing lehr where the glass sheets are heated to their deformation temperature so that they sag by gravity until the lower sheet conforms to the outline bending mold and the upper sheet of the pair sags to conform to the shape of the lower sheet;

(7) Cooling the glass sheets in a controlled manner from their deformation temperature through their annealing range to anneal the glass sheets as soon as the glass sheets attain their desired curvature;

(8) Further cooling the bent annealed sheets to a temperature at which the glass sheets can be handled; and (9) Removing each pair of bent glass sheets from each mold in succession and returning the molds to the loading station for another bending and annealing cycle.

A vital factor in determining the rate of windshield production is the speed of the glass sheet pairs through the bending and annealing lehr. The lehr length determines the number of glass laden molds that can be handled simultaneously. The intensity of heat supplied per unit length of lehr and the amount of lehr heat absorbed by the molds and the lehr determine how much lehr heat is available to heat the glass sheets to their bending temperature and how rapidly the glass laden molds can be conveyed through the bending zone and arrive at the beginning of the cooling zone properly bent within the tolerances required by the customer. The lehr length also determines the time needed to return an unloaded mold from the exit of the lehr to the loading station at the entrance of the lehr.

For any given lehr to produce any given production pattern, the heating elements are controlled to impart a unique series of successive heating patterns designed to correlate with the rate of speed of the bending molds through the bending lehr to cause the glass sheets to conform exactly to the shaping surface of the mold at the time the heated glass enters the cooling and annealing zone. The series of heating patterns form a longitudinal and transverse temperature profile that is unique for each windshield production pattern. A record of the series of heating patterns of longitudinal and transverse temperature profile is kept for that lehr for each production windshield pattern for use whenever production schedules require additional production of a windshield pattern produced previously.

In recent years, automobile sales throughout the world have increased. The growth of automotive sales has required accompanying growth in windshield production. In the past, this increased production was accomplished by building new bending lehrs and running more molds per unit time through existing lehrs than previously by conveying glass laden molds more rapidly through the lehrs than previously while increasing the rate of heat applied to the glass to compensate for the shorter time of exposure of the glass to the hot environment of the bending lehr. In any given lehr, there is a maximum production rate dependent upon the maximum heat input that can be supplied to the bending lehr. Also, the production rate may be limited by the difference in thermal inertia between the shaping rail and the glass.

Thermal inertia as recited in this specification refers to the reluctance of a body to change its temperature in response to a change in environmental temperature. A massive metal shaping rail of large cross section has a higher thermal inertia than a shaping rail having a smaller cross section. Glass has a lower thermal inertia than stainless steel, the material used for shaping rails. Thicker glass sheets have more thermal inertia than thinner glass sheets. Furthermore, the difference in thermal inertia between glass sheets of a given thickness and a stainless steel shaping rail can be minimized by reducing the cross section of the shaping rail. The need for shaping rails of less thermal inertia has been intensified with the reduction of glass sheet thickness in windshields from a nominal ⅛ inch (3.2 millimeters) to 0.090 inch (2.3 millimeters). The thinner glass sheets of present day windshields have less thermal inertia than those included in earlier commercial windshields.

The difference in thermal inertia of the shaping rail and the glass sheet portion in contact with the shaping rail during the heating step needed to bend glass sheets is associated with the phenomenon of chill cracking. Chill cracking occurs when a relatively cool shaping rail portion contacts a relatively hot glass sheet portion during the heating of the glass sheet to its bending temperature. The portions of the relatively low thermal inertia glass in contact with the relatively high thermal inertia shaping rail develop tension stresses when the glass reaches a higher temperature than the shaping rail before the glass sheet reaches the annealing temperature range. Since glass is notoriously weak in tension, surface fissures or cracks are likely to be formed under such circumstances. When the mold is preheated to a temperature sufficient to compensate for its higher thermal inertia than that of the glass so as to avoid having the glass sheet contact the shaping rail at a temperature sufficiently hotter than that of the shaping rail portions in engagement with the glass sheet, tension stresses that tend to cause failure of the glass are usually avoided. However, it is inefficient to have to heat a bending mold prior to each bending cycle in order to reduce the tension stresses in the glass that cause the glass sheets to break. In addition, the prior art found it difficult to reduce the thermal inertia of the shaping rail without causing the mold to lose its structural rigidity.

In the past, the mass of the bending molds used to support the glass sheet for conveyance through the bending lehr was such as to limit the rate of throughput of glass sheets bent in a mass production operation. The relatively heavy weight of the metal bending molds compared to the weight of the glass sheets supported thereon for bending resulted in a relatively inefficient use of the thermal energy imparted into the bending lehr. Previous attempts to reduce the mass of the molds used to shape glass sheets resulted in disappointment because lightening the mass of the molds also reduced the rigidity of the mold so that the molds tended to distort. It would be beneficial to the glass sheet bending art to develop molds of lighter weight than previously that did not distort due to exposure to variations in temperature as a consequence of the glass sheet bending operation.

It also would be beneficial to the glass sheet bending art to develop a method of making outline molds conforming in elevation and outline to the shape desired for the bent glass sheets involving fabrication techniques that do not require localized intense heating such as is necessary for a welding operation which has been used to connect the relatively lightweight shaping rails of the bending molds to more massive mold reinforcing means that require a relatively rigid frame.

DESCRIPTION OF PATENTS OF INTEREST

Canadian Pat. No. 736,880 to Richardson discloses outline molds for bending glass sheets that comprise shaping rails having a thickness in the range of 109 mils to 62 mils and a height vertically disposed and greater than the thickness. Such skeleton-type bending molds are shown directly connected to a rigid frame structure 20 by connecting members 21 which appear to be welded directly to the shaping rail. Since welding requires the application of intense heat, it is quite likely that, unless the shaping rail of the mold is sufficiently massive to have a high thermal inertia sufficient to have a significant effect in retarding the change of temperature of glass sheet portions supported thereon, the rail would be susceptible of distortion in the area of local heating needed to provide a welding connection between the mold shaping rail and the connecting members of the reinforcing frame structure.

U.S. Pat. No. 3,372,015 to Richardson incorporates a box within and below the outline of an outline mold for shaping glass sheets and discusses the heat absorbing properties of different thicknesses of sheet material used for the box.

U.S. Pat. No. 3,484,226 to Golightly discloses an outline mold having longitudinal rails 3 inches (76.2 millimeters) high and 3/16 inch (4.6 millimeters) thick.

U.S. Pat. No. 3,511,628 to Adamson discloses outline bending molds having relatively wide height dimensions compared to the thickness dimension. Exact dimensions are not mentioned.

U.S. Pat. No. 3,586,492 to McMaster shows an outline mold comprising a continuous ring of wire mesh supported on spaced pointed teeth to minimize the mass of materials in engagement with a glass sheet during shaping.

U.S. Pat. No. 3,976,462 to Sutara discloses a mold rail of perpendicular cross section comprising a vertically extending shaping rail having a vertical dimension 40 millimeters high and 5 millimeters thick reinforced by a bar member 15 millimeters wide and 5 millimeters thick attached to the bottom part of the rail. A tab of thin metal is applied to a critical portion of the shaping rail to separate a glass sheet portion likely to develop chill cracking from direct contact with the critical portion of the shaping rail.

U.S. Pat. No. 4,043,785 to Reese discloses a bending and tempering mold having a shaping rail 1.5 inch (38 millimeters) high and having a tapered thickness from 3 millimeters to 0.8 millimeters at its upper edge to reduce the effect of its thermal inertia on the rate of changing the temperature of a contacted glass sheet portion.

U.S. Pat. No. 4,047,916 to Reese et al. and U.S. Pat. No. 4,119,428 to DeAngelis et al disclose outline molds having edgewise disposed shaping rails 38 millimeters high and 3 millimeters thick.

U.S. Pat. No. 4,157,254 to Thomas et al. discloses an outline mold having a shaping rail 5 centimeters high and 3.2 millimeters thick tapering to a thickness of 1.6 millimeters at its upper edge.

In all of these patents, the dimensions of the mold shaping rail are such that the mold shaping rails have a relatively high thermal inertia compared to that of the supported glass sheets. Therefore, the mold must experience considerable preheating prior to the first production run through the bending lehr to prevent the temperature of the more slowly heating shaping rail of the mold from becoming so much cooler than the temperature of the engaged portion of the glass sheet undergoing heating to cause chill cracking.

SUMMARY OF THE INVENTION

It has now been discovered that it is possible to increase the rate of bent windshield production for bent windshield patterns of thinner glass sheets than those of prior commerical windshields without causing chill cracking using shaping rails having low thermal inertia and connected to rigid reinforcing means through fastening capable of securement without needing localized heat that distorts the shape of the shaping rail locally.

According to the present invention, each bending mold for a particular windshield pattern is composed of a shaping rail having a small cross section such that its thermal inertia is much closer to that of the glass sheets undergoing bending than the relatively large cross section shaping rails of the prior art. Furthermore, the outline shaping rail of the present invention is attached to reinforcing means in such a manner as to avoid localized distortions that result from imparting high localized heat directly to the shaping rail when the outline mold is connected to a reinforcing frame during the fabrication of the outline mold structure.

According to a specific embodiment of the present invention, an outline mold for bending glass sheets comprises a shaping rail having a cross section sufficiently small to provide said shaping rail with less thermal inertia and less structural rigidity than shaping rails of prior art outline molds and means to reinforce said shaping rail comprising a rigid reinforcing frame, a plurality of upright rods welded at their lower end portions to spaced points along the rigid reinforcing frame and extending upwardly therefrom, a reinforcing tab for each of said rods having its longest dimension extending approximately vertically and welded at its lower portion only to the upper portion of its associated rod, and fastening means securing the upper portion of each said reinforcing tab to said shaping rail at a fastening point spaced from the remaining fastening points between said other reinforcing tabs and said shaping rail, said fastening means being of the type capable of securement without requiring localized heating at said fastening point. The tabs are secured to the shaping rail in such a manner that the entire body of each tab is spaced from the shaping surface defined by the upper edge of the shaping rail. A preferred embodiment utilizes a rivet, particularly a pop rivet, as the fastening means.

The present invention may be accomplished using a method of fabricating an outline mold for bending glass sheets comprising taking a shaping rail having a desired shape conforming in elevation and outline to the shape and outline slightly inside the periphery of the glass sheets after bending, assembling a plurality of reinforcing tab, securing the reinforcing tabs to the shaping rail at spaced points along the shaping rail with the entire body of each tab spaced from the upper edge of said shaping rail by orienting the width dimension of the rail vertically, drilling an aperture through each of the spaced points of the shaping rail at a fixed distance from its upper edge, drilling an aperture through each tab at a lesser distance from an upper edge of the tab, connecting the tabs to the shaping rail through the apertures, supporting a reinforcing frame in vertically spaced relation to the shaping rail so that the reinforcing tabs are spaced from the reinforcing frame, taking a plurality of connecting rods of different predetermined lengths, selecting one of the connecting rods according to its length, welding one end of the connecting rod to a corresponding reinforcing tab at an end portion thereof spaced from said shaping rail and the other end of said connecting rod to an appropriate portion of the reinforcing frame, and welding additional of said connecting rods according to their lengths in a like manner to different reinforcing tabs in spaced relation along said shaping rail until each said reinforcing tab is connected to the reinforcing frame by a connecting rod of appropriate length. By virtue of this method of fabrication, the shaping rail is spaced from points of application of intense heat during its connection to the frame so as to minimize localized distortion of the shaping rail during its attachment to the rigid reinforcing frame.

The relatively small cross section of the shaping rail of a preferred embodiment of this invention does not permit the shaping rail to have the structural rigidity of prior art shaping rails used in prior art outline molds. However, the rigid reinforcing frame of the mold structure of the present invention provides sufficient structural rigidity to maintain the shape of the shaping rail throughout the glass sheet bending operation. Furthermore, since the shaping rails of the molds conforming to the present invention have a relatively small cross section compared to the cross section of the prior art shaping rails, which provides the shaping rails of this invention with a lower thermal inertia than prior art shaping rails, the rate at which the shaping rails of this invention respond to a change in temperature of the environment to which they are exposed is much closer to the rate at which the supported glass sheets change temperature than is the case with the relatively massive shaping rails of relatively large cross sections of the prior art. Consequently, the molds of the present invention require much less preheating to avoid chill cracking in the glass than is the case for the molds of the prior art. As a consequence, less energy is consumed in preheating the molds prior to a mass production bending operation and less furnace energy is consumed by absorption by the mold structure as the molds and glass sheets are heated during their transport through the bending and annealing lehr than was the case in the prior art. Thus, a lehr of a predetermined length can either be regulated to provide less overall heat for bending pairs of glass sheets mounted on conveyed molds at a given rate of production, or lehrs energized with a predetermined amount of heat conforming to an overall heating pattern for a particular windshield pattern can be employed with molds passing through the lehr at a faster conveyor speed than previously experienced so that the rate of production can be increased without increasing the total amount of energy consumed in the fabrication of bent glass sheets.

These and other advantages of the present invention will be understood more clearly in the light of a description of a specific embodiment that follows.

BRIEF DESCRIPTION OF THE DRAWINGS

In the drawings that accompany a description of an embodiment of this invention, FIG. 1 is a perspective view of a typical lightweight low thermal inertia mold used to bend a pair of glass sheets; and FIG. 2 is an enlarged cross sectional view of a portion of the mold, taken along the line 2—2 of FIG. 1.

DESCRIPTION OF THE PREFERRED EMBODIMENT

Referring to the drawings, an outline mold comprises either a single continuous shaping rail or a plurality of shaping rail sections 10 disposed in end to end relation to define a ring-like outline mold. The upper edge surface of the shaping rail or shaping rail sections conforms in elevation and outline to a configuration similar to and slightly smaller than the periphery of the glass sheets after bending. The shaping rail has a plurality of apertures extending horizontally therethrough. In plan, the outline defined by the mold shaping rail 10 is substantially quadrilateral to conform to the outline shape of a windshield pattern.

A plurality of reinforcing tabs 12 is distributed along the length of the shaping rail 10. Each reinforcing tab 12 is apertured nearer its upper edge than the distance of the apertures extending through the shaping rail 10 from its upper edge. The tabs 12 are secured to the shaping rail 10 by means of a type of securing means 14 capable of securement without requiring localized heating at the fastening points between the reinforcing tabs 12 and the shaping rail 10 in order to avoid local distortion of the shaping rail at said points. Rivets are preferred for the securing means 14, preferably pop rivets, although nuts and bolts can also be used.

A support rod 16 has its upper portion welded to the portion of a corresponding reinforcing tab 12 that is remote from the shaping rail 10. The bottom ends of the support rods are welded to a planar, horizontally disposed mold reinforcing frame 18 having a quadrilateral outline that conforms to the outline of the shaping rail. Referring to the drawing, upper welds 20 are shown at upper attachment points, connecting the upper end portion of each support rod 16 to the lower end of each corresponding reinforcing tab 12 and lower welds 22 are disclosed at lower attachment points connecting the lower end portions of each support rod 16 to spaced attachment points along the rigid reinforcing frame 18.

As stated previously, the outline mold can comprise a single shaping rail extending completely around the perimeter of the outline mold or the shaping rail can comprise a plurality of shaping rail sections disposed in end to end relation along the perimeter of the outline mold. The shaping rail sections may be secured to one another in any known manner, preferably by fastening means of a type capable of securement without requiring localized heating at the fastening point such as tabs and rivets disposed below the upper edge of the shaping rail. It is also possible that certain of the shaping rail sections may be pivotally connected to at least one other of the shaping rail sections to provide a sectionalized bending mold of the outline type such as depicted in several of the patents described previously for producing deeper bends in glass sheets, of which the Canadian patent to Richardson is exemplary.

In order to reinforce shaping rails of relatively small cross section (preferably those that have a thickness approximately 90 mils [2.3 millimeters] and a height less than one inch [25.4 millimeters] and preferably a height of approximately 0.75 inch [19 millimeters]), it is desirable to attach reinforcing tabs to the shaping rail at spaced points along its length and use fastening means of a type capable of securement without requiring localized heating to fasten the tabs to the shaping rail. A specific technique to reinforce a shaping rail having low thermal inertia to a rigid reinforcing frame comprises orienting the shaping rail so that its width extends essentially vertically, making an aperture through each of the spaced points of attachment at a given distance below the shaping surface of the shaping rail, making an aperture through each reinforcing tab at a closer distance to an end of the tab than said given distance, and connecting the reinforcing tabs to the shaping rail through said apertures to insure that the entire body of each reinforcing tab is below the upper edge surface of the shaping rail. The invention uses fastening means of a type capable of securement without requiring localized heating at said fastening point, such as rivets, and particularly pop rivets.

A rigid reinforcing frame whose outline conforms to that of the shaping rail is formed. The shaping rail is supported so that the reinforcing tabs are spaced from the reinforcing frame. A plurality of connecting rods of different lengths is assembled. One of the connecting rods is selected according to its length. One end of the selected rod is welded to an appropriate portion of the rigid reinforcing frame and the other end of the rod is welded to an end portion of the reinforcing tab remote from the shaping rail. Additional of said connecting rods of appropriate lengths are selected and welded to different reinforcing tabs and different portions of the rigid reinforcing frame in a like manner until all the reinforcing tabs are connected to the frame by a connecting rod of appropriate length. Using this technique, the shaping rail is spaced from points of application of intense heat that is characteristic of welding during its connection to the reinforcing frame so as to minimize localized heat distortion of the shaping rail during fabrication of the mold structure.

By virtue of the manner of connecting the shaping rail to the rigid reinforcing frame, it is possible to use shaping rails having less thermal inertia than those used in the prior art. Using rails of smaller cross section and less thermal inertia means that less energy is needed in preheating the shaping rails to a temperature sufficiently higher than that of the glass sheets prior to the entry of the glass laden mold into the lehr so as to avoid the development of chill cracks in the glass.

In a specific embodiment of the present invention, the upright support rods 16 had a diameter of ⅜ inch (9.5 millimeters) and the reinforcing frame 18 was composed of square tubing one inch by one inch (25.4 millimeters by 25.4 millimeters) having a wall thickness of 1/16 inch (1.6 millimeters). Molds having lightweight shaping rails of the present invention ¾ inch (19 millimeters) high by 90 mils (2.3 millimeters) wide required a preheat temperature of only 250° F. (121° C.) for a 315 second heating cycle to avoid chill cracking, whereas it was necessary to preheat prior art outline molds to a preheat temperature 400° F. (204° C.) to avoid chill cracking during a 315 second heating cycle. Furthermore, it was possible to reduce the preheat temperature to only 125° F. (52° C.) when the heating cycle lasted 375 seconds. Under these circumstances, a pair of glass sheets weighing 21¼ pounds (9.6 kilograms) was shaped on a bending mold having a total weight of 16½ pounds (7.8 kilograms) and provided with shaping rails of the type conforming to the present invention, whereas prior to this invention, molds that weighed 37½ pounds (17 kilograms) were used to bend glass sheets of such weight.

Usually, it is necessary to reheat the more massive bending molds of the prior art with relatively massive shaping rails before each bending cycle in order to avoid chill cracking. With the bending molds constructed according to the present invention, after a single pass of a complement of such molds through the bending and annealing lehr, no further heating between successive runs through the bending and annealing lehr is necessary provided the molds are returned through a return conveyor that extends through an overhead hood above the bending and annealing lehr of the type depicted in U.S. Pat. No. 4,072,492 to Castine. Consequently, the amount of energy that is saved using bending molds of the present invention is considerable. Furthermore, the loss of bent glass sheets due to chill cracking has been reduced by converting to molds constructed according to the present invention. Furthermore, the ability to increase the production rate of glass sheets bent while supported on molds having shaping rails of smaller cross section constructed according to the present invention has resulted in a much more efficient use of existing lehrs.

The form of the invention described and illustrated in this specification represents an illustrative preferred embodiment thereof. It is understood that various changes may be made, such as changing dimensions of the mold shaping rail, without departing from the gist of the invention as defined in the claimed subject matter which follows.

We claim:

1. An outline mold for bending glass sheets, comprising:

a shaping rail disposed in edgewise relation so that its upper edge surface conforms in elevation and outline to a configuration similar to and slightly smaller than the periphery of the glass sheets after bending, said shaping rail having a height of less than about 1 inch (2.54 centimeters) and a thickness of about 0.090 inch (2.3 millimeters) to provide reduced thermal inertia of said shaping rail;

a horizontal disposed structurally stable reinforcing frame;

a plurality of upright rods welded at their lower end portion to said reinforcing frame and extending upwardly therefrom;

a reinforcing tab for each of said rods said tab having its longest dimension extending approximately vertically and welded at its lower portion only to the upper portion of its associated one of said rods, said tab having a major surface contacting side surface of said shaping rail and being complementary therewith; and fastening means of the type capable of securement without requiring localized heating for securing the upper portion of each of said reinforcing tab to said shaping rail at a fastening point spaced from adjacent fastening points to prevent distortion of the frame.

2. An outline mold as in claim 1, wherein said shaping rail and said reinforcing tab have apertures and said fastening means comprises a rivet extending through apertures in said reinforcing tab and in said shaping rail that are aligned with one another.

3. An outline mold as in claim 2, wherein said rivet is a pop rivet.

4. An outline mold as in claim 1 or claim 2 or claim 3, wherein said shaping rail comprises a plurality of shaping rail sections disposed in end to end relation along the perimeter of said outline mold.

5. An outline mold as in claim 4, wherein certain of said shaping rail sections are pivotally connected to at least one other of said shaping rail sections adjacent to said certain shaping rail section.

6. An outline mold as in claim 1 or claim 2 or 3, wherein said outline mold has a height of approximately 0.75 inch (19 millimeters).

7. An outline mold as in claim 1 or claim 2 or claim 3, wherein said upright rods interconnecting said frame and said tabs have different lengths to compensate for different heights of different portions of said shaping rail relative to said frame at their points of attachment to said reinforcing tabs.

* * * * *

UNITED STATES PATENT AND TRADEMARK OFFICE
CERTIFICATE OF CORRECTION

PATENT NO. : 4,375,978
DATED : March 8, 1983
INVENTOR(S) : Thomas J. Reese et al.

It is certified that error appears in the above—identified patent and that said Letters Patent is hereby corrected as shown below:

Column 9, line 17, "horizontal" should be --horizontally--.

Signed and Sealed this

Thirty-first Day of May 1983

[SEAL]

Attest:

DONALD J. QUIGG

Attesting Officer     Acting Commissioner of Patents and Trademarks